(12) United States Patent
Schibli et al.

(10) Patent No.: US 11,590,611 B2
(45) Date of Patent: Feb. 28, 2023

(54) DEVICE WITH PROCESSING BEAM SOURCE AND A GUIDE FOR PROCESSING A FILAMENT

(71) Applicants: Heraeus Deutschland GmbH & Co. KG, Hanau (DE); Heraeus Medical Components LLC, St. Paul, MN (US)

(72) Inventors: Stefan Schibli, Hanau (DE); Michael Goettlicher, Hanau (DE); Paul Schuster, St. Paul, MN (US); Joerg-Martin Gebert, Hanau (DE)

(73) Assignees: Heraeus Deutschland GmbH & Co. KG, Hanau (DE); Heraeus Medical Components LLC, St. Paul, MN (US)

( * ) Notice: Subject to any disclaimer, the term of this patent is extended or adjusted under 35 U.S.C. 154(b) by 246 days.

(21) Appl. No.: 16/944,849

(22) Filed: Jul. 31, 2020

(65) Prior Publication Data
US 2021/0031306 A1 Feb. 4, 2021

Related U.S. Application Data

(60) Provisional application No. 62/881,632, filed on Aug. 1, 2019.

(51) Int. Cl.
*B23K 26/08* (2014.01)
*B23K 26/36* (2014.01)
(Continued)

(52) U.S. Cl.
CPC ............ *B23K 26/40* (2013.01); *B23K 26/36* (2013.01); *B65H 54/02* (2013.01); *B65H 57/14* (2013.01);
(Continued)

(58) Field of Classification Search
CPC .......... B23K 26/06; B23K 26/08–0823; B23K 26/083–0846; B23K 26/351;
(Continued)

(56) References Cited

U.S. PATENT DOCUMENTS 4,149,918 A * 4/1979 Cislak ............... B23K 26/0846
156/499
4,675,497 A * 6/1987 Pearl .................. B23K 26/0846
219/121.67
(Continued)

FOREIGN PATENT DOCUMENTS

CN 207982556 10/2018
JP 2007151345 6/2007
WO 2018/096382 5/2018

*Primary Examiner* — Michael A Laflame, Jr.
(74) *Attorney, Agent, or Firm* — Dicke, Billig & Czaja, PLLC

(57) ABSTRACT

One aspect is a device for processing a filament in a process stream, including at least one processing beam source, designed and arranged for emitting at least one processing beam which is suitable for processing a segment of the filament by interaction of the at least one processing beam with the segment of the filament, thereby obtaining a processed filament. The device includes a guide, including a filament feed which is arranged upstream of the at least one processing beam source, and is designed to feed the filament from a feed reel. The guide is designed and arranged to guide the filament so that during the processing the segment of the filament inclines an angle with a vertical axis in the range from 0 to 45°.

16 Claims, 9 Drawing Sheets

(51) Int. Cl.
   *B23K 26/40*     (2014.01)
   *B65H 54/02*     (2006.01)
   *B65H 57/14*     (2006.01)
   *G01N 27/327*    (2006.01)
   *B23K 101/32*    (2006.01)
   *B23K 101/34*    (2006.01)

(52) U.S. Cl.
   CPC ...... *G01N 27/3271* (2013.01); *B23K 2101/32* (2018.08); *B23K 2101/34* (2018.08)

(58) Field of Classification Search
   CPC .......... B23K 26/36–361; B23K 26/362; B65H 54/02; B65H 57/14; B65H 2257/51
   See application file for complete search history.

(56) References Cited

U.S. PATENT DOCUMENTS

| | | | |
|---|---|---|---|
| 5,137,223 A * | 8/1992 | Brandon | B23K 15/002 242/615.3 |
| 5,151,966 A | 9/1992 | Brehm et al. | |
| 2014/0343386 A1 | 11/2014 | Boock et al. | |
| 2016/0256092 A1 | 9/2016 | Rong et al. | |
| 2019/0143449 A1* | 5/2019 | Zenou | C23C 14/28 219/76.1 |
| 2021/0387406 A1* | 12/2021 | Manuel | B23K 26/0648 |

\* cited by examiner

104

400

109

109

700

800

DEVICE WITH PROCESSING BEAM SOURCE AND A GUIDE FOR PROCESSING A FILAMENT

CROSS-REFERENCED TO RELATED APPLICATION

This Non-Provisional patent application claims the benefit of the filing date of U.S. Provisional Patent Application Ser. No. 62/881,632, filed Aug. 1, 2019, of which is incorporated herein by reference.

TECHNICAL FIELD

One aspect relates to a device for processing a filament in a process stream

SUMMARY

One aspect relates to a device for processing a filament in a process stream, the device including at least one processing beam source, designed and arranged for emitting at least one processing beam which is suitable for processing a segment of the filament by interaction of the at least one processing beam with the segment of the filament, thereby obtaining a processed filament; and a guiding means, including a filament feed which is arranged upstream of the at least one processing beam source, and designed to feed the filament from a feed reel. The guiding means is designed and arranged to guide the filament so that during the processing the segment of the filament inclines an angle with a vertical axis in the range from 0 to 45°.

BACKGROUND

Thin multilayer wires are used in applications such as electrochemical sensors. Such wires often include a metal core, a polymer coating and an outer metal coating. Preparing the wire for manufacture of an electrochemical sensor includes high-precision laser ablation of the outer metal layer across defined segments of the wire which are then coated with enzymes. In the prior art, different process schemes are known for implementing the laser ablation. Such process schemes are ablating singulated wires, reel-to-cut processing and reel-to-reel processing. The inventors have found that a combination of specific process schemes with a specific wire orientation during ablation brings about surprising advantages for the production of electrochemical sensors.

Generally, it is an object of the present embodiments to at least partly overcome a disadvantage arising from the prior art.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

The figures show, in schematic form and not to scale, unless stated otherwise in the description or the respective figure.

DETAILED DESCRIPTION

Figure 1:
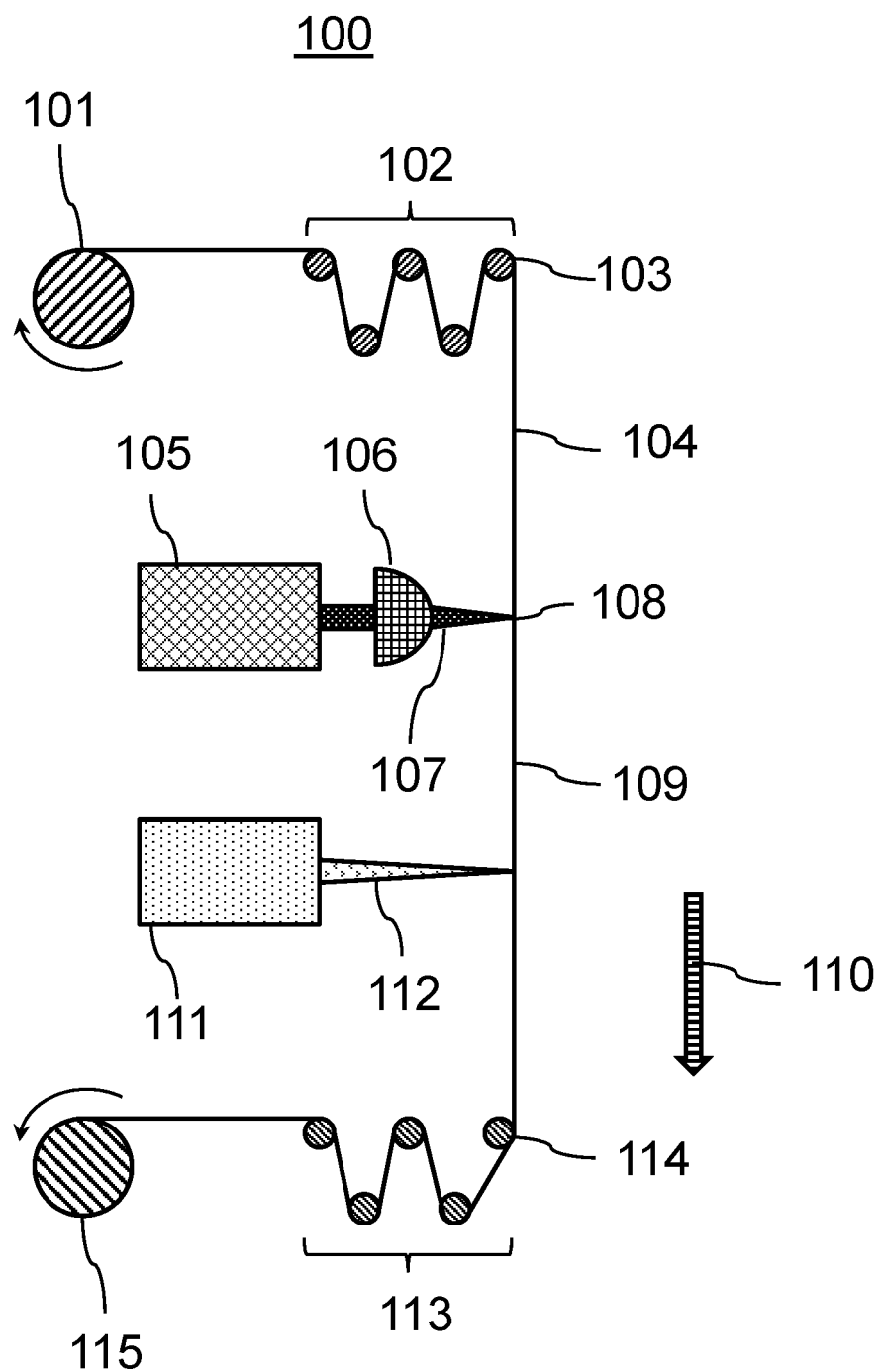
FIG. 1 a device according to one embodiment.

In the following Detailed Description, reference is made to the accompanying drawings, which form a part hereof, and in which is illustrated by way of illustration specific embodiments in which one embodiments may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present embodiments. The following detailed description, therefore, is not to be taken in a limiting sense, and the scope of the present embodiments are defined by the appended claims.

It is to be understood that the features of the various exemplary embodiments described herein may be combined with each other, unless specifically noted otherwise.

It is a further object of one embodiment to provide a device and/or a process for preparing a multilayer wire for manufacture of an electrochemical sensor of high accuracy, in one embodiment in terms of a signal-to-noise-ratio of the sensor or a linearity of a sensor response or both, by means of a process of high production rate. Therein, the process is, in one embodiment, a laser ablation process. In one embodiment, the high production rate is obtained by means of a high process speed or a low number of downtimes or both. The low number of downtimes is, in one embodiment obtained by an as high as possible service life of a processing beam source, such as a laser, used to prepare the wire. Further, it is an object of one embodiment to provide a multilayer wire for manufacture of an electrochemical sensor of as high as possible accuracy, wherein the wire has been prepared at an as high as possible process speed and, in one embodiment also, by consuming as little as possible of a service life of a processing beam source, such as a laser. According to a further object of one embodiment, one of the above advantageous processes and/or devices is provided, wherein the process/device is as simple as possible.

A contribution to at least one of the above objects is given by the independent claims. The dependent claims provide preferred embodiments of the present invention which also serve solving at least one of the above mentioned objects.

A contribution to the solution of at least one of the above objects is provided by an embodiment 1 of a device, according to one embodiment, for processing a filament in a process stream, the device including as components a) at least one processing beam source, designed and arranged for emitting at least one processing beam which is suitable for processing a segment of the filament by interaction of the at least one processing beam with the segment of the filament, thereby obtaining a processed filament; and b) a guiding means, including a filament feed which is
 i) arranged upstream of the at least one processing beam source, and
 ii) designed to feed the filament from a feed reel;

wherein the guiding means is designed and arranged to guide the filament so that during the processing the segment of the filament inclines an angle with a vertical axis in the range from 0 to 45°, in one embodiment from 0 to 40°, in one embodiment from 0 to 35°, in one embodiment from 0 to 30°, in one embodiment from 0 to 25°, in one embodiment from 0 to 20°, in one embodiment from 0 to 15°, in one embodiment from 0 to 10°, and in one embodiment from 0 to 5°. It is particularly preferred that the guiding means is designed and arranged to guide the filament so that during the processing the segment of the filament is arranged essentially vertical. Here, the guiding means may include the feed reel or not. In one embodiment, the device includes no means to cut the filament. Herein, the term "vertical" always refers to inclining an angle of 90° with the ground.

In its embodiment 2, the inventive device is configured according to its embodiment 1, wherein the guiding means further includes a filament take-up means which is arranged downstream of the at least one processing beam source. In one embodiment, between the filament feed and the filament take-up means, the device includes no means to cut the filament.

In its embodiment 3, the inventive device is configured according to its embodiment 2, wherein the filament take-up means is designed for the processed filament to be rolled up on a take-up reel. Here, the guiding means may include the take-up reel or not.

In its embodiment 4, the inventive device is configured according to any of its preceding embodiments, wherein the device is designed for a reel-to-reel-processing of the filament.

In its embodiment 5, the inventive device is configured according to any of its preceding embodiments, wherein the device further includes at least one additional processing beam source, which designed and arranged for emitting at least one additional processing beam which is suitable for processing the segment of the filament by interaction of the at least one additional processing beam with the segment of the filament, wherein the device is designed for processing the segment of the filament A. by interaction of the at least one processing beam with a first circumferential section the segment of the filament, and B. by interaction of the at least one additional processing beam with a at least one further circumferential section the segment of the filament.

In one embodiment, each additional processing beam source is designed and arranged for emitting an additional processing beam which is suitable for processing the segment of the filament by interaction of this additional processing beam with the segment of the filament, wherein device is designed for processing the segment of the filament by interaction of each additional processing beam with a different further circumferential section the segment of the filament. In one embodiment, the first circumferential section and each further circumferential section of the segment are at different positions around a circumference of the segment. In one embodiment, a surface area of the segment is a sum of the surface areas of the first circumferential section and the at least one further circumferential sections of the segment. In one embodiment, the device is designed for providing the at least one processing beam, in one embodiment a focal spot thereof, onto the first circumferential section the segment of the filament and providing the at least one additional processing beam, in one embodiment a focal spot thereof, onto at least one further circumferential section the segment of the filament.

In its embodiment 6, the inventive device is configured according to any of its preceding embodiments, wherein the at least one processing beam is at least one beam of particles or at least one beam of electromagnetic radiation or at least one beam of both. In the latter case, there may be at least one beam of particles and at least one beam of electromagnetic radiation, or at least one beam which is a combination of a beam of particles and a beam of electromagnetic radiation. In one embodiment, the at least one additional processing beam is at least one additional beam of particles or at least one additional beam of electromagnetic radiation or at least one beam of both. A beam of particles may, for example, be a beam of electrons or a beam of ions or both, for example a plasma beam.

In its embodiment 7, the inventive device is configured according to any of its preceding embodiments, wherein the at least one processing beam source is at least one laser and the at least one processing beam is at least one laser beam. In one embodiment, the at least one additional processing beam source is at least one additional laser and the at least one additional processing beam is at least one additional laser beam.

In its embodiment 8, the inventive device is configured according to any of its preceding embodiments, wherein the device further includes a means to focus the at least one processing beam onto the segment of the filament. A preferred means to focus the at least one processing beam onto the segment of the filament is an optical system. A preferred optical system includes a focussing lens. In one embodiment, the device further includes a means to focus the at least one additional processing beam onto the segment of the filament, which is, in one embodiment, also an optical system.

In its embodiment 9, the inventive device is configured according to any of its preceding embodiments, wherein the device further includes an imaging means, designed and arranged to provide an image, in one embodiment a sequence of images, of the segment of the filament after having been processed by the at least one processing beam, in one embodiment, after having been processed also by the at least one additional processing beam.

In its embodiment 10, the inventive device is configured according to its embodiment 9, wherein the imaging means is an image capturing means. A preferred image capturing means is a camera. The image capturing means is designed and arranged for creating and recording an image, in one embodiment a sequence of images, of the segment of the processed filament.

In its embodiment 11, the inventive device is configured according to any of its preceding embodiments, wherein the filament has a length in range from 10 m to 10 km, in one embodiment from 100 m to 8 km, in one embodiment from 500 m to 5 km.

In its embodiment 12, the inventive device is configured according to any of its preceding embodiments, wherein the filament has a diameter in the range from 0.01 to 1.0 mm, in one embodiment from 0.01 to 0.8 mm, in one embodiment from 0.01 to 0.6 mm, and in one embodiment from 0.08 to 0.4 mm. In case of a filament having a non-circular cross-section, the diameter is a length of a longest straight line which starts and ends on the edge of the cross-section.

In its embodiment 13, the inventive device is configured according to any of its preceding embodiments, wherein the filament is one selected from the group consisting of a wire, a cable, and a fibre, or a combination of at least two thereof. A preferred fibre is an optical fibre. A particularly preferred filament is a wire.

In its embodiment 14, the inventive device is configured according to any of its preceding embodiments, wherein the filament includes a core and at least a first layer which superimposes the core, wherein the core consists of a core material, wherein the first layer consists of a first layer material, wherein the first layer material is different from the core material. Herein, the term "superimpose" means that the entities given may follow one another directly, in case of which they are in contact with each other, or indirectly, in case of which there is at least one further entity in-between. In one embodiment, a thickness of the first layer is in the range from 1 to 50 µm, in one embodiment from 2 to 40 µm, in one embodiment from 5 to 35 µm, and in one embodiment from 20 to 30 µm.

In its embodiment 15, the inventive device is configured according to its embodiment 14, wherein the filament further includes a further layer which is disposed between the core and the first layer, wherein the further layer consists of a further layer material, wherein the further layer material is different from the first layer material and from the core material.

In its embodiment 16, the inventive device is configured according to its embodiment 14 or 15, wherein the core material includes a core metal in a proportion in the range from 50 to 100 wt.-%, in one embodiment from 60 to 100 wt.-%, in one embodiment from 70 to 100 wt.-%, in one embodiment from 80 to 100 wt.-%, and in one embodiment from 90 to 100 wt.-%, in each case based on the weight of the core.

In its embodiment 17, the inventive device is configured according to its embodiment 16, wherein the core metal is one selected from the group consisting of platinum, tantalum, palladium, iridium, stainless steel, gold, titanium, tungsten, and niobium, or a combination of at least two thereof. A preferred combination of two or more of the preceding metals is an alloy. A particularly preferred alloy is one selected from the group consisting of a platinum iridium alloy, a platinum tungsten alloy, a tantalum niobium alloy, and a tantalum tungsten alloy.

In its embodiment 18, the inventive device is configured according to any of its embodiments 13 to 16, wherein the first layer material includes a first layer metal or a first polymer in a proportion in the range from 50 to 100 wt.-%, in one embodiment from 60 to 100 wt.-%, in one embodiment from 70 to 100 wt.-%, in one embodiment from 80 to 100 wt.-%, and in one embodiment from 90 to 100 wt.-%, in each case based on the weight of the first layer.

In its embodiment 19, the inventive device is configured according to its embodiment 18, wherein the first layer metal is silver. In addition to the first layer metal, a preferred first layer material includes a further component which, in one embodiment, is a salt of the first layer metal, in one embodiment silver chloride. This is particularly preferred in case of silver as the first layer metal. Hence, a particularly preferred first layer includes a mixture of silver and silver chloride. A preferred silver chloride is AgCl.

In its embodiment 20, the inventive device is configured according to its embodiment 18, wherein the first polymer is one selected from the group consisting of a poly-addition product, a poly-condensation product, a fluoropolymer, and one or more polysiloxanes, or a combination of at least two thereof. A preferred poly-addition product is polyurethane or a polyolefin. A preferred poly-condensation product is one selected from the group consisting of polyimide, polyamide, and polyethylene terephthalate, or a combination of at least two thereof. A preferred polyolefin is polyethylene or polypropylene. A preferred fluoropolymer is one selected from the group consisting of polytetrafluoroethylene (PTFE), perfluoroalkoxy alkane (PFA), and fluorinated ethylene propylene (FEP), or a combination of at least two thereof. A further preferred polymer is a thermoplastic polymer. The preceding preferences of polymers are applicable throughout this text.

In its embodiment 21, the inventive device is configured according to any of its embodiments 15 to 20, wherein the further layer material includes a further polymer in a proportion in the range from 50 to 100 wt.-%, in one embodiment from 60 to 100 wt.-%, in one embodiment from 70 to 100 wt.-%, in one embodiment from 80 to 100 wt.-%, and in one embodiment from 90 to 100 wt.-%, in each case based on the weight of the first layer.

In its embodiment 22, the inventive device is configured according to its embodiment 21, wherein the further polymer is one selected from the group consisting of a poly-addition product, a poly-condensation product a fluoropolymer, and one or more polysiloxanes, or a combination of at least two thereof.

In its embodiment 23, the inventive device is configured according to any of its preceding embodiments, wherein the processing is a subtractive process.

In its embodiment 24, the inventive device is configured according to any of its preceding embodiments, wherein the processing does not include cutting the filament in the segment.

In its embodiment 25, the inventive device is configured according to any of its preceding embodiments, wherein the processing includes at least partially, in one embodiment completely, removing a material from the segment of the filament. In one embodiment, the processing includes at least partially, in one embodiment completely, removing the material from circumferentially around the segment of the filament.

In its embodiment 26, the inventive device is configured according to any of its embodiments 14 to 25, wherein the processing includes at least partially, in one embodiment completely, removing the first layer from the segment of the filament. In one embodiment, the processing includes at least partially, in one embodiment completely, removing the first layer from circumferentially around the segment of the filament. In one embodiment, the processing further includes at least partially, in one embodiment completely, removing the further layer from the segment of the filament, in one embodiment from circumferentially around the segment.

In its embodiment 27, the inventive device is configured according to its embodiment 24 or 25, wherein the removing includes ablation, in one embodiment of at least part of the first layer material, in one embodiment further of at least part of the further layer material.

In its embodiment 28, the inventive device is configured according to any of its preceding embodiments, wherein the guiding means further includes a first tension control means which is arranged up-stream of the at least one processing beam source, wherein the first tension control means is designed and arranged to adapt a tension of the segment of the filament during the processing. In one embodiment, the first tension control means is arranged between the filament feed and the at least one processing beam source.

In its embodiment 29, the inventive device is configured according to its embodiment 28, wherein the first tension control means includes a first multitude of deflection rollers.

In its embodiment 30, the inventive device is configured according to any of its preceding embodiments, wherein the guiding means further includes a further tension control means which is arranged down-stream of the at least one processing beam source, wherein the further tension control means is designed and arranged to adapt a tension of the segment of the filament during the processing. In one embodiment, the further tension control means is arranged between the at least one processing beam source and the filament take-up means.

In its embodiment 31, the inventive device is configured according to its embodiment 30, wherein the further tension control means includes a further multitude of deflection rollers.

In its embodiment 32, the inventive device is configured according to any of its preceding embodiments, wherein, at least in a part of the process stream which includes the processing of the segment of the filament by interaction of the at least one processing beam with the segment of the filament, a direction of the process stream is top down.

In its embodiment 33, the inventive device is configured according to any of its preceding embodiments, wherein the device includes no clamping means for clamping the segment to fix the segment in a direction of a length of the filament, based on the segment, during the processing of the segment of the filament by interaction of the at least one processing beam, and in one embodiment the at least one additional processing beam, with the segment of the filament. In one embodiment, the device includes no fixing means for fixing the filament in a direction of a length of the filament in the segment during the processing of the segment of the filament by interaction of the at least one processing beam, and in one embodiment the at least one additional processing beam, with the segment of the filament. Additionally, or alternatively preferred to the above, the device includes no clamping means for clamping the segment to fix the segment in a direction which is perpendicular to a length of the filament, based on the segment, during the processing of the segment of the filament by interaction of the at least one processing beam, and in one embodiment the at least one additional processing beam, with the segment of the filament. In one embodiment, the device includes no fixing means for fixing the filament in a direction which is perpendicular to a length of the filament in the segment during the processing of the segment of the filament by interaction of the at least one processing beam, and in one embodiment the at least one additional processing beam, with the segment of the filament.

In its embodiment 34, the inventive device is configured according to any of its embodiments 1 to 32, wherein the guiding means includes a clamping means which is designed and arranged for clamping the segment to fix the segment in a direction of a length of the filament, based on the segment, during the processing of the segment of the filament by interaction of the at least one processing beam, and in one embodiment the at least one additional processing beam, with the segment of the filament. Additionally, or alternatively preferred to the above, the device includes a clamping means which is designed and arranged for clamping the segment to fix the segment in a direction which is perpendicular a length of the filament, based on the segment, during the processing of the segment of the filament by interaction of the at least one processing beam, and in one embodiment the at least one additional processing beam, with the segment of the filament.

In its embodiment 35, the inventive device is configured according to any of its preceding embodiments, wherein the device includes the filament, wherein the segment of the filament inclines the angle with the vertical axis.

In its embodiment 36, the inventive device is configured according to any of its preceding embodiments, wherein the device includes the feed reel.

In its embodiment 37, the inventive device is configured according to its embodiment 36, wherein a first part of the filament is rolled up on the feed reel. The feed reel is, in one embodiment, arranged up-stream of the at least one processing beam source. In one embodiment, the segment is down-stream of the first part.

In its embodiment 38, the inventive device is configured according to any of its preceding embodiments, wherein the device includes the take-up reel.

In its embodiment 39, the inventive device is configured according to its embodiment 37, wherein a further part of the filament is rolled up on the take-up reel. The take-up reel is, in one embodiment, arranged down-stream of the at least one processing beam source. In one embodiment, the segment is up-stream of the further part. Further preferred, the segment is between the first and the further part of the filament.

A further contribution to the solution of at least one of the above objects is provided by an embodiment 1 of a process, according to one embodiment, for preparing a processed filament, the process including as steps
   a) provision of a filament, including a segment which is rolled up on a feed reel;
   b) feeding the segment from the feed reel; and
   c) processing the segment by interaction of the segment with at least one processing beam, thereby obtaining the processed filament;
wherein, in the step c), the segment inclines an angle with a vertical axis in the range from 0 to 45°, in one embodiment from 0 to 40°, in one embodiment from 0 to 35°, in one embodiment from 0 to 30°, in one embodiment from 0 to 25°, in one embodiment from 0 to 20°, in one embodiment from 0 to 15°, in one embodiment from 0 to 10°, and in one embodiment from 0 to 5°. Herein, process steps which follow one another in the order of the characters denoting the steps may follow one another directly or indirectly in time. Further, these process steps may be conducted one after the other, in partial temporal overlap or at the same time.

In its embodiment 2, the inventive process is configured according to its embodiment 1, wherein the filament is not cut between the steps a) and c).

In its embodiment 3, the inventive process is configured according to its embodiment 1 or 2, wherein step c) does not include cutting the filament.

In its embodiment 4, the inventive process is configured according to any of its preceding embodiments, wherein the process further includes a step
   d) rolling up the segment of the processed filament on a take-up reel.

In its embodiment 5, the inventive process is configured according to its embodiment 4, wherein the filament is not cut between the steps c) and d). The process may include cutting the processed filament after the step d).

In its embodiment 6, the inventive process is configured according to any of its preceding embodiments, wherein the process is performed as a reel-to-reel-process.

In its embodiment 7, the inventive process is configured according to any of its preceding embodiments, wherein, in the step b), the segment of the filament moves top down.

In its embodiment 8, the inventive process is configured according to any of its preceding embodiments, wherein in the process step c) the processing of the segment includes interaction of the at least one processing beam with a first circumferential section the segment of the filament, and interaction of at least one additional processing beam with a at least one further circumferential section the segment of the filament. In one embodiment, each additional processing beam interacts with a different further circumferential section the segment of the filament. In one embodiment, the first circumferential section and each further circumferential section of the segment are at different positions around a circumference of the segment. In one embodiment, a surface area of the segment is a sum of the surface areas of the first circumferential section and the at least one further circumferential sections of the segment.

In its embodiment 9, the inventive process is configured according to any of its preceding embodiments, wherein the at least one processing beam is at least one beam of particles or at least one beam of electromagnetic radiation or at least one beam of both. In one embodiment, the at least one additional processing beam is at least one additional beam of particles or at least one additional beam of electromagnetic radiation or at least one additional beam of both.

In its embodiment 10, the inventive process is configured according to its embodiment 9, wherein the at least one beam of electromagnetic radiation is at least one laser beam. In one embodiment, the at least one additional beam of electromagnetic radiation is at least one additional laser beam.

In its embodiment 11, the inventive process is configured according to any of its preceding embodiments, wherein, after the step c), the process includes a further step of creating an image, in one embodiment a sequence of images, of the segment of the processed filament.

In its embodiment 12, the inventive process is configured according to its embodiment 11, wherein the further step includes capturing the image, in one embodiment the sequence of images, of the segment of the processed filament.

In its embodiment 13, the inventive process is configured according to any of its preceding embodiments, wherein the filament has a length in range from 10 m to 10 km, in one embodiment from 100 m to 8 km, and in one embodiment from 500 m to 5 km.

In its embodiment 14, the inventive process is configured according to any of its preceding embodiments, wherein the filament has a diameter in the range from 0.01 to 1.0 mm, in one embodiment from 0.01 to 0.8 mm, in one embodiment from 0.01 to 0.6 mm, and in one embodiment from 0.08 to 0.4 mm.

In its embodiment 15, the inventive process is configured according to any of its preceding embodiments, wherein the filament is one selected from the group consisting of a wire, a cable, and a fibre, or a combination of at least two thereof. A preferred fibre is an optical fibre.

In its embodiment 16, the inventive process is configured according to any of its preceding embodiments, wherein the filament includes a core and at least a first layer which superimposes the core, wherein the core consists of a core material, wherein the first layer consists of a first layer material, wherein the first layer material is different from the core material. In one embodiment, a thickness of the first layer is in the range from 1 to 50 µm, in one embodiment from 2 to 40 µm, in one embodiment from 5 to 35 µm, and in one embodiment from 20 to 30 µm.

In its embodiment 17, the inventive process is configured according to its embodiment 16, wherein the filament further includes a further layer which is disposed between the core and the first layer, wherein the further layer consists of a further layer material, wherein the further layer material is different from the first layer material and from the core material.

In its embodiment 18, the inventive process is configured according to any of its preceding embodiments, wherein, in the step c), the processing is a subtractive process step.

In its embodiment 19, the inventive process is configured according to any of its preceding embodiments, wherein, in the step c), the processing includes at least partially, in one embodiment completely, removing a material from the segment of the filament. In one embodiment, the processing includes at least partially, in one embodiment completely, removing the material from circumferentially around the segment of the filament.

In its embodiment 20, the inventive process is configured according to any of its embodiments 16 to 19, wherein, in the step c), the processing includes at least partially, in one embodiment completely, removing the first layer from the segment of the filament. In one embodiment, the processing includes at least partially, in one embodiment completely, removing the first layer from circumferentially around the segment of the filament. In one embodiment, the processing further includes at least partially, in one embodiment completely, removing the further layer from the segment of the filament, in one embodiment from circumferentially around the segment. Here, the at least partial removing of the first layer is in one embodiment effected by interaction of the segment with a first processing beam, and in one embodiment at least one additional processing beam, and the at least partial removing of the further layer by interaction of the segment with a further processing beam. Therein, the first processing beam, and in one embodiment the at least one additional processing beam, on the one hand, and the at least one further processing beam on the other hand are, in one embodiment, different from one another. The first processing beam, and in one embodiment the at least one additional processing beam, on the one hand, and the at least one further processing beam on the other hand are, in one embodiment, laser beams of different laser wavelengths.

In its embodiment 21, the inventive process is configured according to its embodiment 19 or 20, wherein the removing is carried out by ablation, in one embodiment of at least part of the first layer material, in one embodiment further of at least part of the further layer material. Ablation is removal of material from the surface of an object by vaporisation, chipping, or other erosive processes. A preferred ablation is laser-ablation.

In its embodiment 22, the inventive process is configured according to any of its preceding embodiments, wherein, in the step c), the segment is not fixed in a direction of a length of the filament, based on the segment, by contact of the filament with a clamp. Additionally or alternatively preferred, in the step c), the segment is not fixed in a direction which is perpendicular to a length of the filament, based on the segment, by contact of the filament with a clamp.

In its embodiment 23, the inventive process is configured according to any of its embodiments 1 to 21, wherein, in the step c), the segment is fixed in a direction of a length of the filament, based on the segment, by contact of the filament with at least one clamp. Additionally or alternatively preferred, in the step c), the segment is fixed in a direction which is perpendicular to a length of the filament, based on the segment, by contact of the filament with a clamp.

In its embodiment 24, the inventive process is configured according to any of its preceding embodiments, wherein the segment has a length in range from 10 µm to 25 mm, in one embodiment from 01 µm to 20 mm, in one embodiment from 10 µm to 15 mm, and in one embodiment from 20 µm to 10 mm.

A further contribution to the solution of at least one of the above objects is provided by an embodiment 1 of a processed filament, according to one embodiment, obtainable by the inventive process according to any of its embodiments. In one embodiment, outside the segment a thickness of the first layer is in a range from 1 to 50 µm, in one embodiment from 2 to 40 µm, in one embodiment from 5 to 35 µm, and in one embodiment from 20 to 30 µm.

In its embodiment 2, the inventive processed filament is configured according to its embodiment 1, wherein the processed filament is one selected from the group consisting of a wire, a cable, and a fibre, or a combination of at least two thereof. A preferred fibre is an optical fibre.

In its embodiment 3, the inventive processed filament is configured according to its embodiment 1 or 2, wherein the processed filament has a length in range from 10 m to 10 km, in one embodiment from 100 to 8 km, in one embodiment from 500 m to 5 km.

In its embodiment 4, the inventive processed filament is configured according to its embodiment 1 or 2, wherein the processed filament has a length in range from 0.5 to 5 cm, in one embodiment from 0.8 to 4 cm, and in one embodiment from 0.8 to 3 cm.

In its embodiment 5, the inventive processed filament is configured according to any of its preceding embodiments, wherein the processed filament has a maximum diameter in the range from 0.01 to 1.0 mm, in one embodiment from 0.01 to 0.8 mm, in one embodiment from 0.01 to 0.6 mm, and in one embodiment from 0.08 to 0.4 mm. In one embodiment, the processed filament has the preceding diameter outside the segment.

In its embodiment 6, the inventive processed filament is configured according to any of its preceding embodiments, wherein in a segment of the processed filament a diameter of the processed filament is less than outside the segment.

In its embodiment 7, the inventive processed filament is configured according to any of its preceding embodiments, wherein the processed filament includes a core and at least a first layer which superimposes the core, wherein the core consists of a core material, wherein the first layer consists of a first layer material, wherein the first layer material is different from the core material, wherein in a segment of the processed filament
a. a thickness of the first layer is less than outside the segment, or
b. the first layer has been removed.

In its embodiment 8, the inventive processed filament is configured according to its embodiment 7, wherein in the segment of the processed filament
a. the thickness of the first layer is, circumferentially around the processed filament, less than outside the segment, or
b. the first layer has been removed circumferentially around the processed filament.

In its embodiment 9, the inventive processed filament is configured according to its embodiment 7 or 8, wherein the processed filament further includes a further layer which is disposed between the core and the first layer, wherein the further layer consists of a further layer material, wherein the further layer material is different from the first layer material and from the core material. In one embodiment, in the segment of the processed filament, a thickness of the further layer is less than outside the segment, or the further layer has been removed, in each case in one embodiment circumferentially around the processed filament. In one embodiment, the core is of essentially the same diameter in the segment as outside.

In its embodiment 10, the inventive processed filament is configured according to any of its embodiments 7 to 9, wherein the core material includes a core metal in a proportion in the range from 50 to 100 wt.-%, in one embodiment from 60 to 100 wt.-%, in one embodiment from 70 to 100 wt.-%, in one embodiment from 80 to 100 wt.-%, and in one embodiment from 90 to 100 wt.-%, in each case based on the weight of the core.

In its embodiment 11, the inventive processed filament is configured according to its embodiment 10, wherein the core metal is selected from the group consisting of platinum, tantalum, palladium, iridium, tungsten, stainless steel, gold, titanium and niobium, or a combination of at least two thereof.

In its embodiment 12, the inventive processed filament is configured according to any of its embodiments 7 to 11, wherein the first layer material includes a first layer metal or a first polymer in a proportion in the range from 50 to 100 wt.-%, in one embodiment from 60 to 100 wt.-%, in one embodiment from 70 to 100 wt.-%, in one embodiment from 80 to 100 wt.-%, and in one embodiment from 90 to 100 wt.-%, in each case based on the weight of the first layer.

In its embodiment 13, the inventive processed filament is configured according to its embodiment 12, wherein the first layer metal is silver. In addition to the first layer metal, a preferred first layer material includes a further component which, in one embodiment, is a salt of the first layer metal, in one embodiment silver chloride. This is particularly preferred in case of silver as the first layer metal. Hence, a particularly preferred first layer includes a mixture of silver and silver chloride. A preferred silver chloride is AgCl.

In its embodiment 14, the inventive processed filament is configured according to its embodiment 12, wherein the first polymer is one selected from the group consisting of a polyaddition product, a poly-condensation product a fluoropolymer, and one or more polysiloxanes, or a combination of at least two thereof.

In its embodiment 15, the inventive processed filament is configured according to any of its embodiments 9 to 14, wherein the further layer material includes a further polymer in a proportion in the range from 50 to 100 wt.-%, in one embodiment from 60 to 100 wt.-%, in one embodiment from 70 to 100 wt.-%, in one embodiment from 80 to 100 wt.-%, and in one embodiment from 90 to 100 wt.-%, in each case based on the weight of the first layer.

In its embodiment 16, the inventive processed filament is configured according to its embodiment 15, wherein the further polymer is one selected from the group consisting of a poly-addition product, a poly-condensation product a fluoropolymer, and one or more polysiloxanes, or a combination of at least two thereof.

In its embodiment 17, the inventive processed filament is configured according to any of its preceding embodiments, wherein the processed filament is at least partially rolled up on a reel.

A further contribution to the solution of at least one of the above objects is provided by an inventive embodiment 1 of an electrical device, including at least a part of the processed filament according to any of its embodiments, wherein the at least part includes the segment.

In its embodiment 2, the inventive electrical device is configured according to its embodiment 1, wherein the electrical device includes a sensor which includes the at least part of the processed filament. A preferred sensor is an electrochemical sensor.

In its embodiment 3, the inventive electrical device is configured according to its embodiment 1 or 2, wherein the electrical device is a medical device. A preferred medical device is an implantable medical device.

A further contribution to the solution of at least one of the above objects is provided by an inventive embodiment 1 of a use of at least one laser for processing a segment of a filament in a reel-to-reel process by interaction of the segment with at least one laser beam from the at least one laser while the segment inclines an angle in the range from 0 to 45°, in one embodiment from 0 to 40°, in one embodiment from 0 to 35°, in one embodiment from 0 to 30°, in one embodiment from 0 to 25°, in one embodiment from 0 to 20°, in one embodiment from 0 to 15°, in one embodiment from 0 to 10°, and in one embodiment from 0 to 5°, with a vertical axis. The at least one laser may include or be a first and/or a further laser as described herein in context of the device or the process of one embodiment. Further, the filament is, in one embodiment, a filament in accordance with any of the embodiments of the device or the process of one embodiment.

Features described as preferred in one category of one embodiment, such as the inventive device or the process of one embodiment, are likewise preferred in a respective embodiment of the further categories of one embodiment, including the use of the laser.

Filament

In the context of one embodiment, the filament may be any kind of filament which the skilled person deems appropriate. Herein, a filament is a linear, non-rigid element which has a length that is at least 10 times, in one embodiment at least 100 times, and in one embodiment at least 1000 times, a diameter of the filament. Therein, "non-rigid" means that the filament is flexible at least to a degree which allows to reversibly roll the filament up on a roll without damaging the filament. In a cross-section, the filament may have any shape which the skilled person deems appropriate. In one embodiment, the filament has a cross-sectional shape, selected from the group consisting of circular, rectangular, oval, and elliptical, wherein a circular cross-section is particularly preferred. A particularly preferred filament is a wire. In that case, at least a core of the filament includes a metal in a proportion in the range from 50 to 100 wt.-%, in one embodiment from 60 to 100 wt.-%, in one embodiment from 70 to 100 wt.-%, in one embodiment from 80 to 100 wt.-%, and in one embodiment from 90 to 100 wt.-%, in each case based on the weight of the at least core. A preferred metal is biocompatible.

In one embodiment, the core metal, in one embodiment the core material, is biocompatible. In one embodiment, the first layer material, in one embodiment the first layer metal or the first polymer, is biocompatible. In one embodiment, the further layer material, in one embodiment the further polymer, is biocompatible. In one embodiment, each of the materials of the filament defined herein is biocompatible materials. A preferred filament consists essentially of biocompatible materials. A preferred biocompatible material is one selected from the group consisting of biotolerant, bioinert and bioactive or a combination of at least two thereof.

In one embodiment, a thickness of the first layer is in the range from 1 to 50 µm, in one embodiment from 1 to 25 µm, and in one embodiment from 5 to 15 µm. In one embodiment, the further layer has a thickness in the range from 1 to 50 µm, in one embodiment from 5 to 40 µm, and in one embodiment from 20 to 30 µm. A preferred filament or processed filament includes an auxiliary layer between the core and the first layer, in one embodiment between the core and the further layer. In one embodiment, the auxiliary layer has a thickness in the range from 0.1 to 10 µm, in one embodiment from 0.5 to 5 µm, and in one embodiment from 1 to 3 µm. A preferred auxiliary layer includes a metal in a proportion in the range from 50 to 100 wt.-%, in one embodiment from 60 to 100 wt.-%, in one embodiment from 70 to 100 wt.-%, in one embodiment from 80 to 100 wt.-%, and in one embodiment from 90 to 100 wt.-%, in each case based on the weight of the auxiliary layer. In that context, a preferred metal is one selected from the group consisting of platinum, tantalum, palladium, iridium, tungsten, and niobium, or a combination of at least two thereof. A preferred auxiliary layer is a clad.

Segment

The segment of the filament is a section of the filament, an extension of which is limited in a longitudinal direction of the filament, i.e. a length of the segment is shorter than a length of the filament. In one embodiment, the length of the filament is at least 100 times, in one embodiment at least 1000 times, the length of the segment.

Guiding Means

In the context of one embodiment, the guiding means may be any means which the skilled person deems suitable for guiding the filament such that the segment is arranged during the processing as defined in any of the embodiments 1 of the device and the process of one embodiment. In general, the guiding means is one or more elements of the device according to one embodiment which defines an orientation of the segment during the processing. Further, the guiding means may define a fixation of the segment during processing or a tension of the segment during processing or both. The orientation of the segment may, for example, be achieved by an appropriate arrangement of the filament feed or the filament take-up means or both. Alternatively, the orientation of the segment during processing may be achieved by means of suitably arranged deflection rollers of the guiding means. Those deflection rollers may be part of the first and/or further tension control means.

Processing

In the context of one embodiment, the processing of the filament may be any kind of processing which the skilled person deems appropriate and which can be achieved by interaction of the at least one processing beam with the segment of the filament. A particularly preferred processing includes removing part of the filament in the segment, in one embodiment by ablation, in one embodiment laser-ablation. If the device includes more than one processing beam source, for example a first processing beam source and at least one additional processing beam source, the processing of the segment refers to a cumulative processing by interaction of the segment with processing beams from all these processing beam sources, such as the first and further processing beams. The processed filament is obtained by the overall processing of the segment.

In one embodiment, the device includes a first processing beam source which is designed and arranged for emitting a first processing beam and a further processing beam source which is designed and arranged for emitting a further processing beam, the first and the further processing beams both being suitable for processing the segment of the filament by interaction with the segment of the filament, thereby obtaining the processed filament. Accordingly, in the context of the device as well as the process and the use of one embodiment, the processing, in one embodiment, includes a step (c1)) including interaction of a first processing beam with the segment and a step (c2)) including interaction of a further processing beam with the segment, thereby obtaining the processed filament. The device may further comprise at least one additional processing beam source, which designed and arranged for emitting at least one additional processing beam which is suitable for processing the segment of the filament by interaction of the at least one additional processing beam with the segment of the filament. In that case, the step (c1)), in one embodiment, includes interaction of at least one additional processing beam with the segment.

In the following, preferred features of the at least one processing beam source or the at least one laser, the at least one processing beam or the at least one laser beam apply to both, the first and the further processing beam sources and the first and the further processing beams.

The at least one processing beam and the respective at least one processing beam source may be any beam, respective beam source, which the skilled person deems appropriate for processing the filament in the segment. A preferred processing beam is a beam of electromagnetic radiation. Accordingly, a preferred processing beam source is an electromagnetic emitter. A particularly preferred beam of electromagnetic radiation is a laser beam. Accordingly, a particularly preferred electromagnetic emitter is a laser. A preferred laser beam is pulsed laser beam.

A preferred first beam of electromagnetic radiation has a spectrum with a peak wavelength in the range from 430 to 780 nm, in one embodiment from 430 to 640 nm, in one embodiment from 430 to 600 nm, in one embodiment from 490 to 600 nm, in one embodiment from 490 to 570 nm, in one embodiment from 500 to 560 nm, in one embodiment from 510 to 550 nm, in one embodiment from 520 to 540 nm, in one embodiment from 525 to 540 nm, and in one embodiment from 528 to 536 nm. Additionally or alternatively, a preferred first laser beam is obtainable from a solid-state laser. A gain medium of the solid-state laser is, in one embodiment, a crystal. A preferred crystal is doped with neodym. A preferred neodym-doped crystal includes yttrium. A preferred crystal which includes yttrium is selected from the group consisting of Nd:YAG, Nd:$Y_3Al_5$, $O_{12}$, and Nd:$YVO_4$. Therein, Nd:$YVO_4$ is particularly preferred. Additionally or alternatively, a preferred first laser beam is pulsed at a frequency in the range from 5 to 600 kHz, in one embodiment from 10 to 500 kHz, in one embodiment from 20 to 500 kHz, in one embodiment from 30 to 450 kHz, in one embodiment from 40 to 400 kHz, in one embodiment from 50 to 350 kHz, in one embodiment from 80 to 300 kHz, in one embodiment from 90 to 250 kHz, in one embodiment from 100 to 200 kHz, and in one embodiment from 110 to 190 kHz. Additionally or alternatively, a preferred first pulsed laser beam has a fluence in the range from 1.0 to 5.0 J/$cm^2$ per pulse, in one embodiment from 1.5 to 4.5 J/$cm^2$ per pulse, in one embodiment from 2.0 to 4.0 J/$cm^2$ per pulse, and in one embodiment from 2.5 to 3.8 J/$cm^2$ per pulse. Additionally or alternatively, a preferred pulsed first laser beam is characterised by an energy per pulse in the range from 2 to 15 µJ, in one embodiment from 2 to 13 µJ, in one embodiment from 3 to 10 µJ, and in one embodiment from 4 to 8 µJ. Additionally or alternatively, a preferred pulsed first laser beam is characterised by a pulse duration in a range from 10 fs to 500 ns, in one embodiment from 50 fs to 400 ns, in one embodiment from 100 fs to 300 ns, in one embodiment from 500 fs to 200 ns, in one embodiment from 1 to 100 ns, in one embodiment from 10 to 100 ns, and in one embodiment from 15 to 80 ns.

The processing, in one embodiment, includes sweeping a spot of the at least one processing beam, in one embodiment of the first processing beam, across a surface of the segment in a first multitude of linear sweeps. Further in one embodiment, this spot is of a size in the range from 5 to 50 µm, in one embodiment 5 to 40 µm, in one embodiment 5 to 30 µm, in one embodiment 10 to 20 µm. In one embodiment, the preceding size is the length of a diameter of the spot. A preferred spot is a focal spot. Further in one embodiment, the spot is about circular. The linear sweeps of the first multitude of linear sweeps are, in one embodiment, conducted in the same direction. This case is also referred to as uni-directional processing. Alternatively preferred, a first fraction of the linear sweeps of the first multitude of linear sweeps are conducted in a first direction, wherein a further fraction of the linear sweeps of the first multitude of linear sweeps are conducted in a further direction, wherein the further direction is opposite to the first direction. This case is also referred to as bi-directional processing. The linear sweeps of the first multitude of linear sweeps, in one embodiment, incline angles with a length of the filament, as oriented in the segment, in the range from 0 to 30°, in one embodiment from 0 to 20°, in one embodiment from 0 to 10°, in one embodiment from 0 to 5°. In one embodiment the linear sweeps of the first multitude of linear sweeps are parallel to the length of the filament, as oriented in the segment. Alternatively preferred, the linear sweeps of the first multitude of linear sweeps incline angles with a length of the filament, as oriented in the segment, in the range from 60 to 90°, in one embodiment from 70 to 90°, in one embodiment from 80 to 90°, in one embodiment from 85 to 90°. In one embodiment the linear sweeps of the first multitude of linear sweeps are perpendicular to the length of the filament, as oriented in the segment. A distance between the linear sweeps of the first multitude of linear sweeps is preferred to be in the range from 5 to 50 µm, in one embodiment from 5 to 40 µm, in one embodiment from 5 to 30 µm, in one embodiment from 8 to 20 µm, and in one embodiment from 10 to 20 µm. This distance is determined in a centre-to-centre manner. In the technical field, this distance is often also referred to as pitch. In the above sweeping, the spot, in one embodiment, moves relative to the surface of the segment at a velocity in the range from 100 to 3000 mm/s, in one embodiment from 200 to 2500 mm/s, in one embodiment from 400 to 2000 mm/s, in one embodiment from 600 to 1800 mm/s, and in one embodiment from 800 to 1600 mm/s. In the first multitude of linear sweeps the spot of the first processing beam, in one embodiment, sweeps across each position on the surface of a first circumferential section of the segment, in one embodiment of the whole segment, at least once. Hence, in this embodiment, the first multitude of linear sweeps covers the entire surface of the first circumferential section, in one embodiment of the whole segment. In other words, in the first multitude of linear sweeps, the first processing beam scans the entire surface of the first circumferential section, in one embodiment of the whole segment. The above sweeping, in one embodiment, includes repeating the first multitude of linear sweeps 1 to 15 times, in one embodiment 1 to 10 times, in one embodiment 1 to 8 times, in one embodiment 2 to 7 times, and in one embodiment 2 to 5 times.

A preferred further beam of electromagnetic radiation has a spectrum with a peak wavelength in the range from 10 to 430 nm, in one embodiment from 100 to 430 nm, in one embodiment from 150 to 430 nm, in one embodiment from 180 to 400 nm, in one embodiment from 200 to 400 nm, in one embodiment from 220 to 400 nm, and in one embodiment from 220 to 380 nm. A particularly preferred electromagnetic radiation of the further kind has spectrum with a peak wavelength in the range from 220 to 280 nm, in one embodiment from 230 to 260 nm; or from 300 to 400 nm, in one embodiment from 330 to 380 nm. A preferred further laser beam is obtainable from a further solid-state laser, or from an Excimer laser. A gain medium of the further solid-state laser is, in one embodiment, a crystal. A preferred crystal is doped with neodym. A preferred neodym-doped crystal includes yttrium. A preferred crystal which includes yttrium is selected from the group consisting of Nd:YAG, $Nd:Y_3Al_5$, $O_{12}$, and $Nd:YVO_4$. Therein, $Nd:YVO_4$ is particularly preferred. A preferred Excimer laser includes a gain medium selected from the group consisting of $F_2$, ArF, KrF, XeCl-laser, and XeF, or a combination of at least two thereof. In one embodiment, the further laser beam is pulsed at a frequency in the range from 1 to 100 kHz, in one embodiment from 10 to 80 kHz, in one embodiment from 20 to 60 kHz. Additionally or alternatively preferred, a fluence of the further pulsed laser beam is in the range from 0.1 to 50.0 $J/cm^2$ per pulse, in one embodiment from 0.2 to 30.0 $J/cm^2$ per pulse, in one embodiment from 0.3 to 20.0 $J/cm^2$ per pulse. In one embodiment, the fluence of the further pulsed laser beam is in the range from 0.1 to 50.0 $J/cm^2$ per pulse, in one embodiment from 0.2 to 30.0 $J/cm^2$ per pulse. In a further in one embodiment, the fluence of the further pulsed laser beam is in the range from 1 to 20.0 $J/cm^2$ per pulse, in one embodiment from 11 to 18 $J/cm^2$ per pulse, in one embodiment from 12.0 to 17.0 $J/cm^2$ per pulse. Additionally or alternatively preferred, the further pulsed laser beam is characterised by a pulse duration in a range from 10 fs to 500 ns, in one embodiment from 50 fs to 400 ns, in one embodiment from 100 fs to 300 ns, in one embodiment from 500 fs to 200 ns, in one embodiment from 1 ns to 100 ns, in one embodiment from 1 to 50 ns, in one embodiment from 1 to 30 ns, in one embodiment from 1 to 15 ns, and in one embodiment from 1 to 10 ns. Additionally or alternatively preferred, the further pulsed laser beam is characterised by a pulse duration in a range from 10 fs to 500 ns, in one embodiment from 50 fs to 400 ns, in one embodiment from 100 fs to 300 ns, in one embodiment from 500 fs to 200 ns, in one embodiment from 1 ns to 100 ns, in one embodiment from 1 to 50 ns, in one embodiment from 5 to 30 ns, and in one embodiment from 10 to 20 ns. Additionally or alternatively preferred, the further pulsed laser beam is characterised by an energy per pulse in the range from 1 to 50 µJ in one embodiment from 5 to 40 µJ, in one embodiment from 10 to 30 µJ in one embodiment from 10 to 25 µJ in one embodiment from 10 to 20 µJ in one embodiment from 12 to 18 µJ and in one embodiment from 14 to 16 µJ.

The processing, in one embodiment, includes sweeping a spot of the further processing beam across a surface of the segment in a further multitude of linear sweeps. In one embodiment, the linear sweeps of the further multitude of linear sweeps are conducted in the same direction. Further in one embodiment, this spot is of a size in the range from 2 to 50 µm, in one embodiment 2 to 40 µm, and in one embodiment 5 to 30 µm, in one embodiment 5 to 20 µm, in one embodiment 5 to 15 µm. In one embodiment, the preceding size is the length of a diameter of the spot. A preferred spot is a focal spot. Further in one embodiment, the sport is about circular.

In the alternative, it is preferred, that a first fraction of the linear sweeps of the further multitude of linear sweeps are conducted in a first direction, wherein a further fraction of the linear sweeps of the further multitude of linear sweeps are conducted in a further direction, wherein the further direction is opposite to the first direction. Here, the first and further directions of the processing with the further processing beam may be the same or different from the first and further directions of the processing with the first processing beam. The linear sweeps of the further multitude of linear sweeps, in one embodiment, incline angles with a length of the filament, as oriented in the segment, in the range from 0 to 30°, in one embodiment from 0 to 20°, in one embodiment from 0 to 10°, in one embodiment from 0 to 5°. In one embodiment the linear sweeps of the further multitude of linear sweeps are parallel to the length of the filament, as oriented in the segment. Alternatively preferred, the linear sweeps of the further multitude of linear sweeps incline angles with a length of the filament, as oriented in the segment, in the range from 60 to 90°, in one embodiment from 70 to 90°, in one embodiment from 80 to 90°, in one embodiment from 85 to 90°. In one embodiment the linear sweeps of the further multitude of linear sweeps are perpendicular to the length of the filament, as oriented in the segment. A distance between the linear sweeps of the further multitude of linear sweeps is, in one embodiment, in the range from 1 to 50 µm, in one embodiment from 2 to 40 µm, in one embodiment from 3 to 30 µm, in one embodiment from 4 to 20 µm, and in one embodiment from 5 to 15 µm. This distance is determined in a centre-to-centre manner. In the technical field, this distance is often also referred to as pitch. In the above sweeping, the spot, in one embodiment, moves relative to the surface of the segment at a velocity in the range from 10 to 3000 mm/s, in one embodiment from 50 to 2000 mm/s, in one embodiment from 100 to 1800 mm/s, in one embodiment from 100 to 1600 mm/s, in one embodiment from 100 to 1000 mm/s, in one embodiment from 150 to 800 mm/s, and in one embodiment from 200 to 600 mm/s. In the further multitude of linear sweeps the spot of the further processing beam, in one embodiment, sweeps across each position on the surface of a circumferential section of the segment, in one embodiment of the whole segment, at least once. Hence, in this embodiment, the further multitude of linear sweeps covers the entire surface of the circumferential section, in one embodiment of the whole segment. In other words, in the further multitude of linear sweeps, the further processing beam scans the entire surface of the circumferential section, in one embodiment of the whole segment. The preceding sweeping, in one embodiment, includes repeating the further multitude of linear sweeps 1 to 15 times, in one embodiment 1 to 10 times, in one embodiment 1 to 8 times, in one embodiment 2 to 7 times, and in one embodiment 1 to 5 times.

Reel-to-Reel-Processing

Reel-to-reel-processing means provision of the filament at least partially rolled up on a reel, at least partially unwound from the reel, then processed and then at least partially rewound on a further reel. In one embodiment, the filament is not cut in that process. Here, cutting means separating the filament into at least two distinct filaments.

Diameter

In case of a non-circular shape, such as a cross-section of the filament, the diameter of the shape is a length of a longest straight line which starts and ends on the edge of the shape.

Test Methods

The test methods which follow were utilized within the context of one embodiment. Unless stated otherwise, the measurements were conducted at an ambient temperature of 23° C., an ambient air pressure of 100 kPa (0.986 atm) and a relative air humidity of 50%.

Spectrum and Peak Wavelength

In case of a laser beam as beam of electromagnetic radiation, the peak wavelength of the spectrum is the nominal peak wavelength of the laser output. This is either the wavelength at which the laser lases or, if a non-linear optical process is used to alter the output wavelength, the respective harmonic of the lasing wavelength. For example, a KrF-Excimer laser typically has a lasing wavelength at about 248 nm. A Nd:YVO$_4$-laser typically has a lasing wavelength at about 1064 nm. If the light of the Nd:YVO$_4$-laser is frequency doubled, the peak wavelength of the laser output is at about 532 nm. If the beam of electromagnetic radiation is not a laser beam, the spectrum of this electromagnetic radiation is measured using a spectrometer of the type CCS200 from Thorlabs GmbH. The measurement is conducted in accordance with the manufacturer's instructions. The peak wavelength of the measured spectrum is then a local maximum of the spectrum which is also its global maximum.

Pulse Frequency

The pulse frequency is defined as the number of pulses, emitted per unit of time. The pulse frequency of a pulsed laser is adjusted at the device. Any pulse frequency, referred to herein, means the pulse frequency as adjusted at the device.

Pulse Duration

The pulse duration is defined as the time duration between the intensity levels of a pulse measured at FWHM (full width at half-maximum). It is measured with a suitable photo diode and an oscilloscope.

Fluence

The fluence is defined as energy per pulse [J]/effective focal spot area [cm$^2$]. Therein, the effective focal spot area is calculated as the area of a circle of a diameter which is the spot size according to the test method below.

Energy Per Pulse

The energy per pulse is determined by first measuring the accumulated energy of the beam over a period of irradiation of 1 second using a thermal power meter. If the focus of the beam is on the workpiece, this energy is measured right in front of the workpiece, i.e. slightly out of the focus point. The pulse frequency is determined as described above. The energy per pulse is calculated by dividing the accumulated energy by the pulse frequency in Hz.

Spot Size

The 2D-intensity distribution of the spot is measured using a 2D power meter. The spot size is determined by fitting a circle to the Full Width at Half Maximum (FWHM) of the 2D-intensity distribution. The spot size is the diameter of this circle.

One embodiment is illustrated further by way of example hereinafter by examples and figures. The embodiments are neither restricted to the examples nor the figures.

In the comparative examples (not according to the invention) and the examples (according to the invention), wires which have been prepared as described below are processed as described further below.

Preparation of Wires 3 km long wires which consist from the inside to the outside of a core of tantalum, a platinum layer, a polyurethane layer and a layer consisting of a mixture of silver and AgCl (Ag/AgCl-layer), are prepared as described in the following.

A wire precursor consisting of a core of tantalum and a cladding of platinum is prepared. This is effected by drawing a tube made of platinum on a rod made of tantalum. Further a conventional wire drawing method is applied to the wire precursor. This includes single die drawing (elongation per die 5 to 15%) the wire precursor at a drawing speed of about 10 m/min using lubrication oil. Ultrasonic cleaning and rinsing of the wire precursor are conducted in-line. Subsequently, an intermediate annealing step is conducted at an annealing temperature of 800° C. Therein, the wire precursor is moved through a furnace at an annealing speed of 20 m/min. Thereby, mechanical properties of the wire precursor are adjusted. Subsequently, multi die drawing (elongation per die 10 to 20%) is conducted at a drawing speed of 30 m/min using lubrication oil. Ultrasonic cleaning and rinsing of the wire precursor are conducted inline. Further in-line, the wire precursor is coated with a resin of polyurethane. This is done by applying a wet film of the resin on the wire using enameling dies. Then the applied resin is dried thermally and the polymer is cured in an annealer. The applying, drying and curing steps are repeated 10 to 40 times in order to obtained a polyurethane layer thickness of about 20 µm. The polyurethane layer is coated in-line with an Ag/AgCl-layer.

This is done by applying a paste, which includes silver particles, AgCl, binder and solvent, to the polyurethane layer by enamel dies. The applied paste is dried thermally and cured. The steps of applying, drying and curing are repeated 2 to 10 times in order to obtain a 10 µm thick Ag/AgCl. A paste with a fineness of grind (as defined in ASTM D1316) of about 12 to 5 µm (50 point) and about 12 to 20 µm (fourth continuous scratch), and a temperature of about 300 to 450° C. is used for application of the Ag/AgCl layer.

Fineness of grind as defined in ASTM D1316 is measured by dragging a paste through a wedge using a scraping tool, from the deep end to the shallow end, and the location of the fourth continuous scratch is measured at a scale. This value corresponds to the fourth-largest particle agglomerate size in the paste. Furthermore, the so-called "50 point" is measured at the location where half of the surface of the wedge is scratched.

Wire Processing

Comparative Example 1

In the comparative example 1, the wire is unwound and singulated into individual wires, each having a length of 25 mm, by laser cutting. Each singulated wire is processed by irradiating an about 7 mm long segment of the wire with an Nd:YVO$_4$-laser having a peak laser wavelength at 532 nm. The preceding output wavelength is obtained by frequency doubling the lasing wavelength of about 1064 nm of the Nd:YVO$_4$-crystal. The laser is pulsed at a frequency of 160 kHz, wherein each pulse has an energy of 5 µJ and a duration (width) of about 60 ns. The laser beam is focussed down to a focal beam diameter of 15 µm on the wire surface. Each laser pulse has a fluence of 2.8 J/cm$^2$. In order to remove the Ag/AgCl-layer (first layer) completely from the segment by laser ablation, as far as possible without damaging the underlying polyurethane layer, the laser beam focal spot is swept across the surface of the Ag/AgCl-layer in the segment at a speed of 1250 mm/s in a multitude of linear sweeps (also called lines). The linear sweeps of this multitude are conducted in an uni-directional manner. The linear sweeps of the multitude of linear sweeps are parallel to the length of the filament, as oriented in the segment. A distance between the linear sweeps of the first multitude of linear sweeps (also referred to as pitch) is 13 μm. The multitude of linear sweeps covers the surface of the Ag/AgCl-layer across the whole segment circumferentially around the wire. In the above described sweeping, the multitude of linear sweeps is repeated 4, which makes 5 passes in total. The singulated wires have a natural curvature which may vary from one singulated wire to another. In order to allow for the high-precision laser processing, each singulated wire has to be brought into a defined position by fixing the vertically oriented wire with clamps. In addition, the wire needs to be straightened by applying a defined tension. Only after the wire has been prepared that way laser ablation processing can be conducted.

Comparative Example 2

Figure 8:
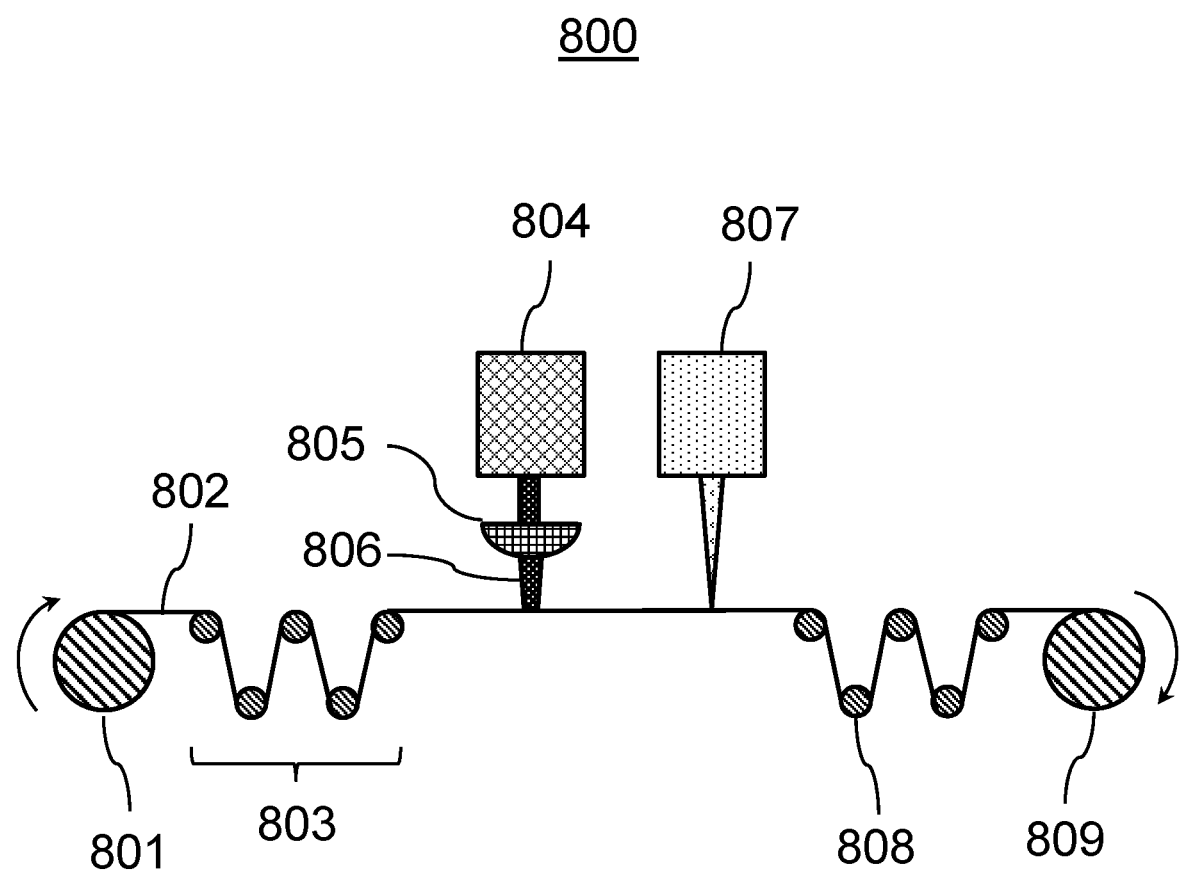
FIG. 8 a device not according to one embodiment.

In the comparative example 2, the wire is processed in a reel-to-reel manner. A setup in accordance with FIG. 8 is used here. Accordingly, the part of the wire which is to be processed by laser ablation is oriented horizontally. Analogously to the comparative example 1, each 25 mm of the wire, an about 7 mm long segment of the wire is processed by laser-ablating the Ag/AgCl-layer. The processed parts of the wire are re-wound onto a take-up reel. Positioning and straightening of the wire segment for processing is effected by the tension control means shown in FIG. 8. The wire is not clamped prior to laser processing. Due to the considerable weight of the wire, in particular of the wire core, unwinding the wire leads to vibrations which cause some uncertainty of the exact position of the wire segment to be processed next. As no clamping should be used here, the laser beam needs to be focussed less in order to achieve a broader scan field of the laser. In addition, laser processing time needs to be increased in order to ensure complete ablation of the Ag/AgCl-layer from the segment (reduced fluence of the laser beam).

Comparative Example 3

The comparative example 3 is conducted as comparative example 2, however, here the laser beam is focussed as in the comparative example 1 and the wire is clamped prior to activating the laser in order to reduce the vibrations of the wire. This corresponds to the setup of FIG. 9.

Example 1

In the example 1, the wire is processed in a reel-to-cut manner. Accordingly, the wire is unwound successively. Each 25 mm of the wire, the Ag/AgCl-layer is removed by laser ablation across an about 7 mm long segment as described above in the context of the comparative example 1. Therein, the free end of wire is oriented vertically. Further, this end is not clamped prior to ablation. The processed parts of the wire are not re-wound but cut into 25 mm long single wires.

Example 2

Example 2 is conducted as comparative example 1 with the following exception. In order to allow for a more precise positioning and straightening of the wire part to be laser-ablated, the free end of the wire is clamped prior to each step of laser ablation (processing of each segment). Afterwards, the clamps are released and further 25 mm of the wire are unwound from the reel for processing.

Example 3

Example 3 is conducted as comparative example 3, however, without clamping the wire prior to laser ablation. Instead, the segment of the wire to be processed is oriented at 45° to the vertical axis in order to reduce wire vibrations.

Example 4

Example 4 is conducted as example 3, however, using an angle of the segment of the wire to be processed of 25° to the vertical axis.

Example 5

Example 5 is conducted as example 3, however, orienting the segment of the wire to be processed essentially vertical. This corresponds to the setup shown in FIG. 1 as described below.

The following table provides an overview of the comparative examples and examples.

|  | Process Type | Clamping | Segment Orientation |
| --- | --- | --- | --- |
| Comparative Example 1 | individual wires | yes | vertical |
| Comparative Example 2 | reel-to-reel | no | horizontal |
| Comparative Example 3 | reel-to-reel | yes | horizontal |
| Example 1 | reel-to-cut | no | vertical |
| Example 2 | reel-to-cut | yes | vertical |
| Example 3 | reel-to-reel | no | 45° to the vertical axis |
| Example 4 | reel-to-reel | no | 25° to the vertical axis |
| Example 5 | reel-to-reel | no | vertical |

Evaluation

In order to evaluate the comparative examples and examples, the overall process speeds of the laser ablation processes described above are compared. Further, average service lives of the Nd:YVO$_4$-lasers as used in the laser ablation processes are compared. Moreover, the quality of the laser ablation is assessed. After having processed the wires as described above for the comparative examples and examples, the processed segments of the wires are studied under an optical microscope for damages to the polyurethane-layer (PU-layer) which has been laid open. Any changes to the layer surface, such as molten regions or structures introduced to the surface of the PU-layer, are rated as disadvantageous. As a reference without damages to the PU-layer, a wire precursor which has been prepared as described above, but without application of the Ag/AgCl-layer is used. Further, the processed wire are assessed for the sharpness of the transitions between ablated and non-ablated regions of the wire. The results of the above studies are summarised in the below table. Therein, "−−" means a result which is less favourable than "−", "−" means a result which is less favourable than "0", which means a result that is less favourable than "+", which means a result that is less favourable than "++", which means a result that is still less favourable than "+++".

|  | Process Speed | Service Life of Laser | Ablation Quality |
|---|---|---|---|
| Comparative Example 1 | -- | + | + |
| Comparative Example 2 | 0 | − | − |
| Comparative Example 3 | − | + | + |
| Example 1 | + | + | 0 |
| Example 2 | 0 | + | + |
| Example 3 | + | + | + |
| Example 4 | + | + | ++ |
| Example 5 | + | + | +++ |

It can be seen from the above table that a favourable combination of high process speed, long laser service life and high ablation quality can only be achieved by means of the inventive examples. Without wishing to be bound to this theory, the unfavourable ablation quality of comparative example 2 may stem from a risk of over-processing the wire segments. Over-processing may lead to some damages, i.e. structuring, of the polyurethane layer. Here, it should be considered that damaging the PU-layer means to partially structure the outer surface of the PU-layer. In result, a surface tension of the outer surface of the PU-layer is not uniform across the exposed region of the PU-layer. In preparing an electrochemical sensor from the processed wire, this may lead to non-uniform coating thicknesses of enzyme layers on the wire. The signal-to-noise ratio of the sensor as well as the linearity of the sensor response may suffer in result. Further, comparative example 2 suffers from less sharp transitions between ablated and non-ablated regions of the wire. Less sharp transitions may have a detrimental effect on sensor accuracy as well. Hence, the device and process according to one embodiment allow to produce wires for high accuracy electrochemical sensors at a high production rate with few downtimes for maintenance.

FIG. 1 shows a device 100, according to one embodiment, for processing a filament 104 in a process stream 110. The device includes a first processing beam source 105 which is designed and arranged for emitting a first processing beam 107 that is suitable for processing a segment 108 of the filament 104 by interaction of the first processing beam 107 with the segment 108 of the filament 104, thereby removing an outer Ag/AgCl-layer of the filament 104 in the segment 104 and, thus, obtaining a processed filament 109. The first processing beam source 105 is a frequency-doubled Nd:YVO$_4$-laser. Accordingly, the first processing beam 107 is a laser beam with a peak wavelength at 532 nm. The device 100 further includes a focussing means 106 which is a focussing objective of focal length 250 mm. The device 100 is designed for a reel-to-reel-processing of the filament 104. Accordingly, the device includes a guiding means which, upstream of the laser, includes a filament feed that is designed to feed the filament 104 from a feed reel 101 which is also part of the device 100. Further, downstream of the laser, the guiding means includes a filament take-up means which is designed for the processed filament 109 to be rolled up on a take-up reel 115. Here, the guiding means includes the takeup reel 115. The guiding means further includes a first tension control means 102 which is designed and arranged to adapt a tension of the segment 108 of the filament 104 during the processing. The first tension control means 102 includes a first multitude of deflection rollers 103. In addition, the guiding means includes a further tension control means 113 which is arranged down-stream of the laser. The further tension control means 113, as well, is designed and arranged to adapt a tension of the segment 108 of the filament 104 during the processing. The further tension control means 113 includes a further multitude of deflection rollers 114. The first 102 and the further tension control means 113 are further designed and arranged to guide the filament 104 so that during the processing the segment 108 of the filament 104 is oriented essentially vertical. The device 100 further includes an imaging means 111 which is a camera that is designed and arranged for creating and recording images of the processed segment via image acquisition 112 for quality control. The filament 104 is the wire described in the context of FIG. 3 below.

Figure 2:
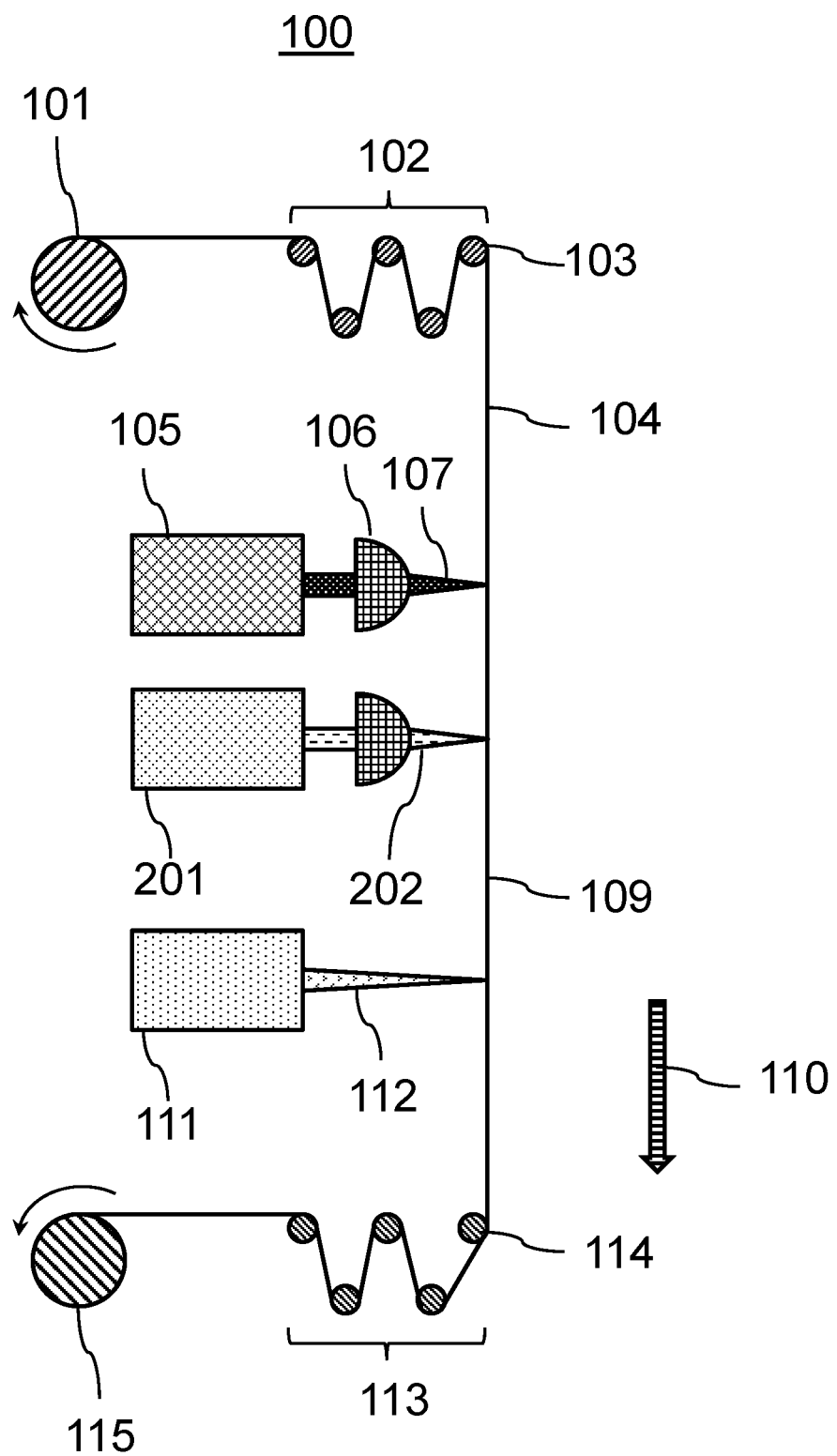
FIG. 2 a further device according to one embodiment.

FIG. 2 shows a further device 100 according to one embodiment. The device 100 of FIG. 2 is identical to the device 100 of FIG. 1, except for additionally including a further processing beam source 201 which is designed and arranged for emitting a further processing beam 202 that is suitable for further processing the segment 108 of the filament 104 by interaction of the further processing beam 202 with the segment 108, thereby further removing a polyurethane layer of the filament 104 in the segment 108, the polyurethane layer having been laid open by processing with the Nd:YVO$_4$-laser as described in the context of FIG. 1 and, thus, obtaining the processed filament 109. The further processing beam source 201 is a KrF-Excimer-laser. Accordingly, the further processing beam 202 is a further laser beam with a peak wavelength at 248 nm. The device 100 further includes a focussing objective for focussing the further laser beam onto the segment 108.

Figure 3:
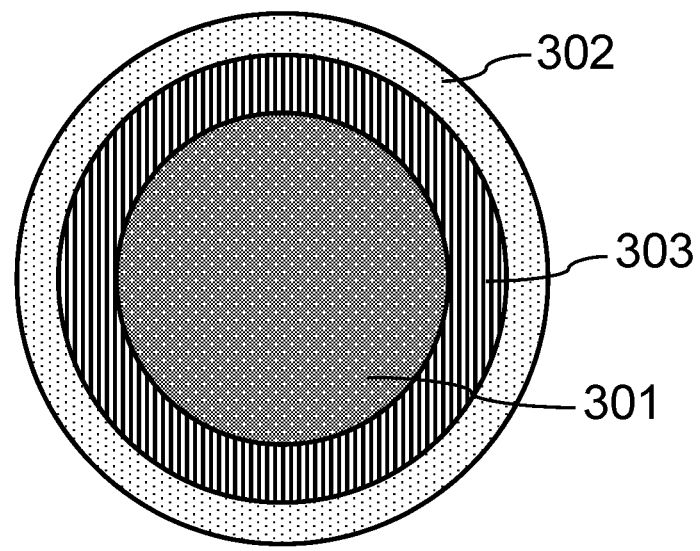
FIG. 3 a cross-sectional view of the filament of FIGS. 1 and 2.

FIG. 3 shows a cross-sectional view of the unprocessed filament 104 of FIGS. 1 and 2. The filament 104 is a multilayer wire having an overall diameter of about 200 µm. This wire includes a core 301 and a 7 µm thick first layer 302 which superimposes the core 301. The core 301 consists of platinum, whereas the first layer 302 consists of a mixture of silver and AgCl. A further layer 303 is disposed between the core 301 and the first layer 302, wherein the further layer 303 consists of polyurethane. The wire has this structure across its whole length of 3 km.

Figure 4:
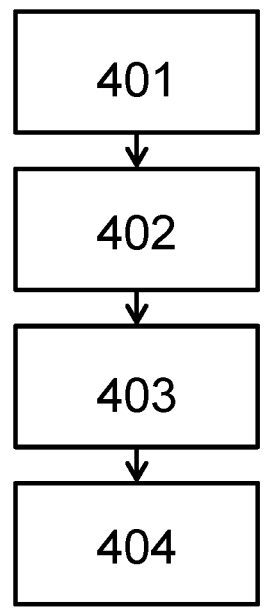
FIG. 4 a flow-chart of a process according to one embodiment.

FIG. 4 shows a flow-chart of a process 400 according to one embodiment for preparing a processed filament 109. The process 400 includes a step a) 401 of providing the wire of FIG. 3 wound on a feed reel 101. Therein, the wire includes a segment 108. In a process step b) 402 a part of the wire which includes the segment 108 is un-wound from the feed reel 101. Process step c) 403 includes processing the segment 108 by interaction with a first processing beam 107, thereby obtaining the processed filament 109. In the step c) 403, the segment 108 is oriented essentially vertically. In a step d) 404, a part of the processed filament 109 which includes the segment 108 is wound on a take-up reel 115. The process 400 is a reel-to-reel process.

Figure 5:
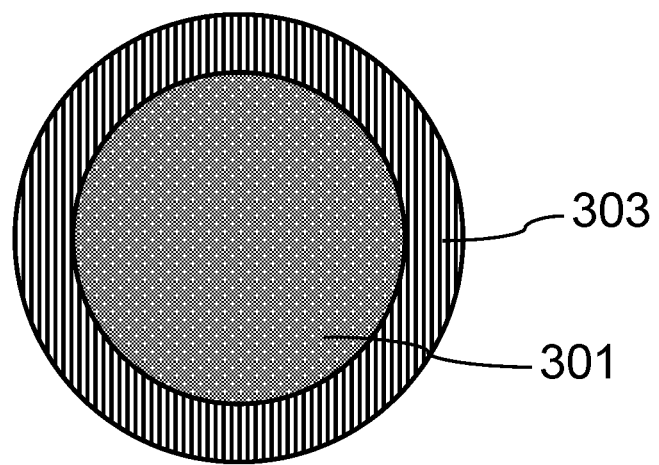
FIG. 5 a cross-sectional view of the segment of the processed filament of FIG. 1.

FIG. 5 shows a cross-sectional view of the segment 108 of the processed filament 109 of FIG. 1. By comparison with FIG. 3 it can be seen that the first layer 302 has been removed completely without harming the further layer 303.

Figure 6:
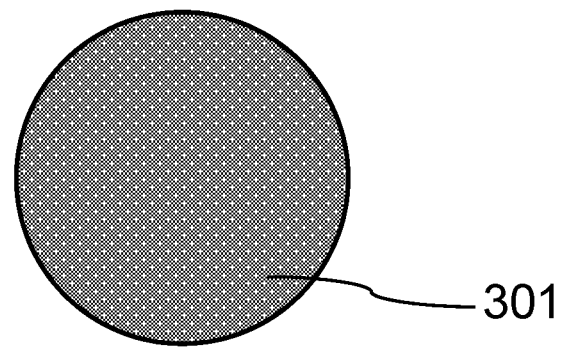
FIG. 6 a cross-sectional view of the segment of the processed filament of FIG. 2.

FIG. 6 shows a cross-sectional view of the segment 108 of the processed filament of FIG. 2. By comparison with FIG. 3 it can be seen that the first layer 302 and the further layer 303 have been removed completely without harming the core 301.

Figure 7:
FIG. 7 an electrical device according to one embodiment.

FIG. 7 shows an electrical device 700 according to one embodiment. The electrical device 700 includes at least a part of the processed filament 109 of FIG. 5, wherein the part includes the processed segment 108, depicted in FIG. 5. Here, the electrical device 700 is a medical device and the part of the processed filament 109 is a component of an electrochemical sensor.

FIG. 8 shows a device 800 not according to one embodiment for laser ablating a multilayer wire. The device 800 includes a feed reel 801 from which a wire 802 can be fed to a tension control means 803, including deflection rollers 808; and downstream to processing by laser-ablation with a laser beam 806 emitted by a laser 804 and focussed by a focussing lens 805; further downstream to a camera 807; a further tensions control means 803, including further deflection rollers 808; and to re-winding onto a take-up reel 809. Here, the segment of the wire to be processed with the laser beam is oriented horizontally.

Figure 9:
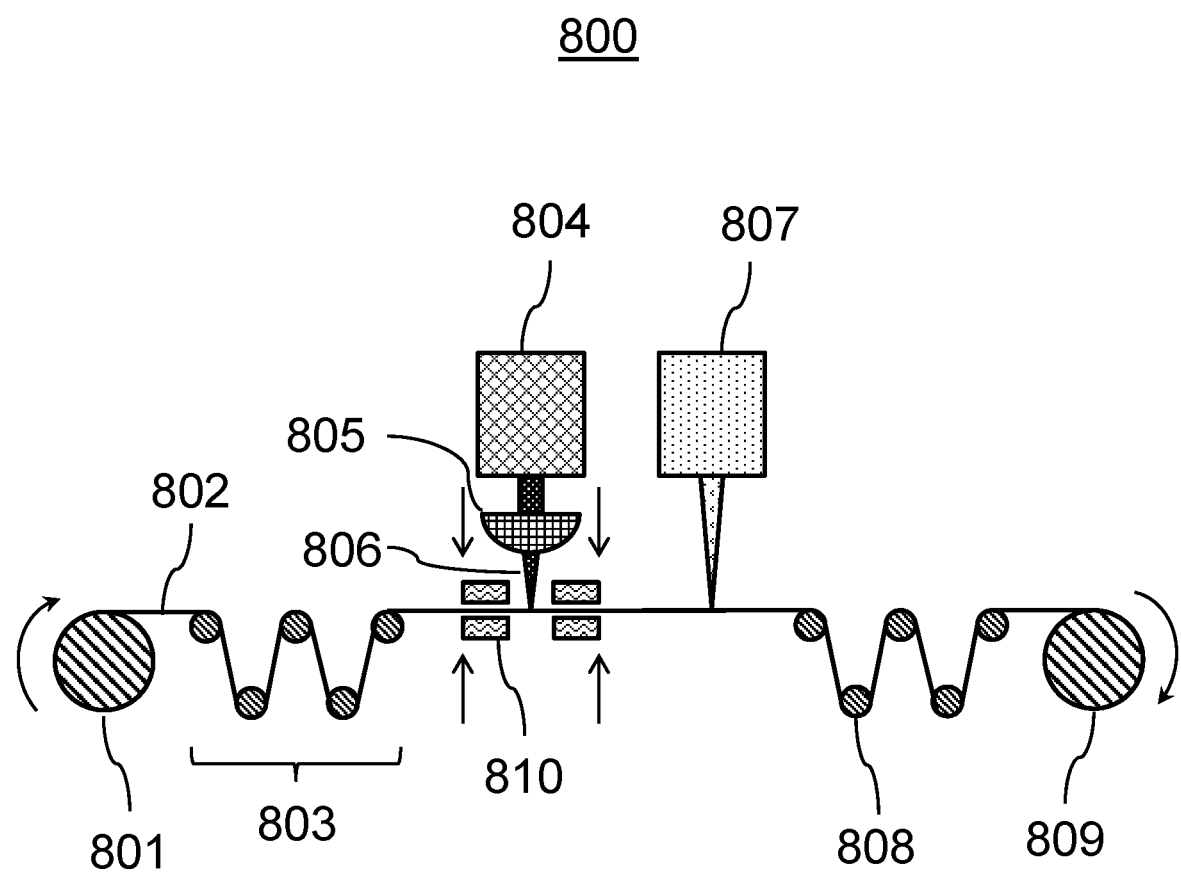
FIG. 9 a further device not according to one embodiment.

FIG. 9 shows a further device 800 which is not according to the invention. The device 800 is the device 800 of FIG. 9 with the addition of clamps 810 which allow for spatially fixing the segment of the wire prior to activating the laser.

Although specific embodiments have been illustrated and described herein, it will be appreciated by those of ordinary skill in the art that a variety of alternate and/or equivalent implementations may be substituted for the specific embodiments illustrated and described without departing from the scope of the present embodiments. This application is intended to cover any adaptations or variations of the specific embodiments discussed herein. Therefore, it is intended that these embodiments be limited only by the claims and the equivalents thereof.

The invention claimed is:

1. A device for processing a filament in a process stream, the device comprising:
   a) at least one processing beam source, designed and arranged for emitting at least one processing beam which is suitable for processing a segment of the filament by interaction of the at least one processing beam with the segment of the filament, thereby obtaining a processed filament; and
   b) a guiding means, comprising a filament feed which is
      i) arranged upstream of the at least one processing beam source, and
      ii) designed to feed the filament from a feed reel;
   wherein the guiding means is designed and arranged to guide the filament so that during the processing with the at least one processing beam source the segment of the filament inclines an angle with a vertical axis in the range from 0 to 45°.

2. The device according to claim 1, wherein the guiding means further comprises a filament take-up means which is arranged down-stream of the at least one processing beam source.

3. The device according to claim 2, wherein the filament take-up means is designed for the processed filament to be rolled up on a take-up reel.

4. The device according to claim 1, wherein the device further comprises at least one additional processing beam source, which designed and arranged for emitting at least one additional processing beam which is suitable for processing the segment of the filament by interaction of the at least one additional processing beam with the segment of the filament,
   wherein the device is designed for processing the segment of the filament
   A. by interaction of the at least one processing beam with a first circumferential section the segment of the filament, and
   B. by interaction of the at least one additional processing beam with a at least one further circumferential section the segment of the filament.

5. The device according to claim 1, wherein the at least one processing beam source is at least one laser and the at least one processing beam is at least one laser beam.

6. The device according to claim 1, wherein the filament is one selected from the group consisting of a wire, a cable, and a fibre, or a combination of at least two thereof.

7. The device according to claim 1, wherein the filament comprises a core and at least a first layer which superimposes the core,
   wherein the core consists of a core material,
   wherein the first layer consists of a first layer material,
   wherein the first layer material is different from the core material.

8. The device according to claim 7, wherein the filament further comprises a further layer which is disposed between the core and the first layer,
   wherein the further layer consists of a further layer material,
   wherein the further layer material is different from the first layer material and from the core material.

9. The device according to claim 1, wherein the device comprises the filament, wherein the segment of the filament inclines the angle with the vertical axis.

10. The device according to claim 1, wherein the device comprises the feed reel, wherein, a first part of the filament is rolled up on the feed reel.

11. The device according to claim 3, wherein the device comprises the take-up reel, wherein, a further part of the filament is rolled up on the take-up reel.

12. A method for preparing a processed filament, the method comprising:
   a) providing a filament, comprising a segment which is rolled up on a feed reel;
   b) feeding the segment from the feed reel; and
   c) processing the segment by interaction of the segment with at least one processing beam, thereby obtaining the processed filament;
   wherein, in processing the segment with the at least one processing beam source, the segment inclines an angle with a vertical axis in the range from 0 to 45°.

13. The method according to claim 12 further comprising:
   d) rolling up the segment of the processed filament on a take-up reel.

14. A processed filament obtainable by the method according to claim 12.

15. An electrical device, comprising at least a part of the processed filament according to claim 14, wherein the at least part comprises the segment.

16. A use of at least one laser for processing a segment of a filament in a reel-to-reel process by interaction of the segment with at least one laser beam from the at least one laser while the segment inclines an angle in the range from 0 to 45° with a vertical axis.

* * * * *